(12) United States Patent
Jackson (10) Patent No.: US 8,668,147 B2
(45) Date of Patent: Mar. 11, 2014

(54) HEADPHONES HOLDER WITH INDICIA OF STORED VALUE

(75) Inventor: Jim Jackson, Plymouth, MN (US)

(73) Assignee: BBY Solutions, Inc., Richfield, MN (US)

( * ) Notice: Subject to any disclaimer, the term of this patent is extended or adjusted under 35 U.S.C. 154(b) by 310 days.

(21) Appl. No.: 13/043,589

(22) Filed: Mar. 9, 2011

(65) Prior Publication Data
US 2012/0230531 A1    Sep. 13, 2012

(51) Int. Cl.
*G06K 15/00*    (2006.01)
(52) U.S. Cl.
USPC .......................................................... 235/383
(58) Field of Classification Search
USPC .................................. 235/380, 383, 385, 492
See application file for complete search history.

(56) References Cited

U.S. PATENT DOCUMENTS

| 7,322,519 B2 * | 1/2008 | Blank et al. ................... 235/380 |
| 7,380,663 B2 * | 6/2008 | Bingham et al. .............. 206/460 |
| 8,091,781 B2 * | 1/2012 | Albrecht et al. .............. 235/380 |

* cited by examiner

*Primary Examiner* — Seung Lee
(74) *Attorney, Agent, or Firm* — Beck + Tysver PLLC (57) ABSTRACT

The present invention is a headset holder coupled with indicia of stored value. The indicia of stored value may be printed or painted on, or otherwise permanently coupled to, the holder itself, or may be included in a stored value or gift card that is attached to the holder. The headset holder and the stored value card may be constructed from a single sheet of plastic; in such embodiments, separation of the stored value card from the headset holder may be supported by a scoreline in the plastic material. The headset holder may have a spool and two grips. One grip may be configured to secure earphones and the other grip may be configured to secure a jack of the headset. The spool may be configured for winding headset wire. The holder may be configured to hold primarily an earbud headset. The grips may extend or protrude from a central portion, or body of the holder. The spool may also extend from the body. The holder may display an image, such as the image of a creature or plant. The image may depict the grips as hands of a displayed creature. The image may depict the spool as the head of the creature.

3 Claims, 7 Drawing Sheets

HEADPHONES HOLDER WITH INDICIA OF STORED VALUE

FIELD OF THE INVENTION

The present invention relates to stored value media. More specifically, it relates to a headphones holder to which indicia of stored value are attached.

BACKGROUND OF THE INVENTION

A stored value card is a card that represents some kind of value, typically financial value. For example, a stored value card might be redeemable at a particular store for a certain monetary value in merchandise or services. A stored value card might simply represent an amount of cash, which might be used, for example, as a substitute for a credit or debit card in making any kind of purchase, or to pay off debt. A stored value card might be restricted to a particular set of products or services; for example, it might represent ten deluxe car washes at some gas station. A gift card is a particular kind of stored value card, one purchased by a donor as a gift for, e.g., a friend, a relative, or an employee.

A stored value card must typically be activated before it can be used to spend a portion of its stored value. This requirement protects the card retailer by reducing both the likelihood and the consequences of theft while the cards are displayed, and accessible to the public, in a store. The card is activated by an initial scanning at the point of sale at the time when it is purchased, and, at the same time, an initial amount is associated with the card.

The initially added funds give the stored value card an initial value balance. The stored value represented by the card is reduced when the card is used to make a purchase. Additional value for the card can typically be purchased from the card issuer or a card seller. In the case of a gift card, the donee or the donor might be able to buy additional stored value.

The balance of value remaining on the stored value card may be stored as an account in an electronic recordkeeping system, or database. In this case, the card must contain a device that provides identifying indicia for the account, such as a bar or UPC code, a magnetic stripe, a radio frequency identification (RFID) tag, a smart chip, or other identifying device. In general, account indicia, such as a magnetic stripe or a barcode, and may also include a human readable number and a Product Identification Number (PIN). A stored value card may include a plurality of account indicia, such as a barcode, a human readable number corresponding to the barcode, and a magnetic stripe.

In the case of a card with a smart chip, or other device where the card itself contains logic in the form of hardware (including possibly a processor) and/or software instructions, the stored value balance may be maintained within the card itself. When a stored value card is redeemed, for example to make a purchase, then the account balance is reduced by the purchase amount. At a retail establishment, the account balance is usually automatically adjusted at the point of sale by the action of scanning the card, or manually by a salesperson making a data entry.

A stereo headset is a pair of speakers, or headphones, that, when in operation, are worn close to a user's ears. A monaural headset may have a single headphone worn on one ear. The headphones include means for communicating from a source, such as a personal audio device, to feed audio through the speakers. Examples of personal audio devices include handheld electronics devices such as portable music players and cell phones; computers; portable video/movie players; recorders; dictation machines; and in-home stereo and television systems. Although this document deals primarily with wired communication, headphones may also be wireless. In a wired headset, wires typically connect the speakers to a connector or jack. The jacks can have a variety of configurations, with different standards for different purposes. A jack having a 3.5 mm diameter is a standard used for portable electronic devices, such as cell phones and portable music players, and laptop computers.

A headset also includes means for holding the speakers close to the user's ears. In some headsets, a metal or plastic band straddles the user's head, with the length and/or tension in the band keeping earmuff-style headphones in place. Earbuds, or earphones, are small headphones that are placed inside the user's ear canal. An earbud may be held in place simply by pressure from the ear chamber itself, or may be attached to a holder or brace that goes partially around the ear for this purpose. An earbud headset is lightweight, compact, and relatively inexpensive. Portable music players and cell phones are often packaged for sale together with a compatible earbud headset.

Typically, earbud headset wiring will be shaped like the letter 'Y'. The jack will terminate a single wire of the headset, corresponding to the lower portion of the Y. To provide specificity, we will refer to this single wire is the "jack wire" of the headset. At some junction point, the single wire will fork into a two wires, with a respective earbud terminating each of the wires in the pair. We will refer to this pair of wires as the "earbud wires" of an earbud headset.

SUMMARY OF THE INVENTION

The wires of some headsets, particularly earbud headphone sets, are flexible, long, and narrow in diameter, so they may be relatively easy to tangle and knot. A headset holder is a device around which the wires of a headset can be wrapped to keep the parts of the headset organized and accessible, and the wires free from tangles, knots, and snags, while the headset is not in use.

Exemplary embodiments of the invention include a headset holder that includes two grips and a spool. A spool is a structure about which a wire can be wound. In some such embodiments, earbuds of an earbud headset may be held by one grip, the jack may be held by the other grip, and the bulk of the wire may be wrapped around the spool.

In some embodiments, a headset holder may be constructed from an essentially flat sheet of material. The material might be any material, or combination of materials, that is relatively stiff, for example, plastic, cardboard, or metal. In some cases, such a headset holder might be described as having a left side, a right side, a top, and a bottom, the geometry of the holder forming a two dimensional (2D) shape. An extremity, extension, or projection at the top or bottom of the shape (given some orientation that is intuitive given the visual or functional attributes of the shape) might serve as a spool. A projection extending from a side of the shape might serve as a grip. The shape might have extremities on each side, each serving as a grip. A grip may have the shape generally of the letter 'U' or the letter 'L'. The invention encompasses many forms of grips, including all types of structures that can hold a wire, a jack, or a headphone.

In some embodiments, the shape may be the shape of a human, an animal, a monster, or a plant. In such embodiments, an extremity terminating in a grip may resemble a feature associated with the shape, such as a hand, claw, paw, or pair of tree limbs. The spool may resemble the head or legs of a monster, creature, or person, the trunk of a tree, the stalk of a plant, or extremity of any type of solid object whether natural or human-devised.

The surface of a 2D headset holder may display an image. The image may show a monster, a human, an animal, or a plant. The image may be incorporated onto or into the surface in any way, such as printing, painting. etching, inscribing, imaging (e.g., by drop on demand technology), inkjet, heat lamination, or by combining parts of different shapes and/or colors. The displayed image and the shape of the holder may correspond, so that, for example, the image displays a head on an extremity that resembles a head at the top of the holder, or legs on one or more extremities at the bottom of the holder; or images of arms extending from the left and right sides of the holder, with grips perhaps having images that appear like hands.

The combination of a headset holder with a gift card might suggest to a recipient that the gift card be used to purchase a particular type of gift. For example, the donor might want to suggest the purchase of a personal music player, that could be used with the headset.

Account indicia may be coupled to, or integrated into, a headset holder in a variety of ways. If the headset holder has a 2D shape, then it might be attached directly to a stored value card. The stored value card may be coplanar with the holder shape. If the holder and stored value card are constructed from a single sheet of material, then a scoreline—an indentation or perforation in the material—may define a boundary between the holder and the card. Bending the card along the boundary relative to the holder may separate the card from the holder. A broad range of materials are available, including plastic, polyvinyl chloride (PVC), polyethylene terephthalate (PET), TESLIN®, styrene, polylactide (biodegradable corn plastic), or paperboard, or cardboard.

Account indicia may also be integrated into the holder itself by, for example, printing, painting, or incorporation of a plaque or other object into or onto the holder, thereby combining the functionality of the headset holder with all the advantages of a stored value card. In general, a headset holder with stored value account indicia can have all the capabilities and features of the holder itself.

Identifying indicia for the account may be permanently coupled directly to the holder, for example on an external surface. When we say that an account indicium is "permanently coupled" to a headset holder, we mean that the holder is designed to make it difficult for a user to remove the account indicium. For example, the indicium might be printed or painted directly onto the holder. The account indicia might be printed on a plastic or metal plaque. Such plaque or other object containing a surface into which the indicia is printed, embedded, or integrated, might be permanently coupled by glue, by welding, by screws or bolts, or by stitching with thread or other fiber, depending on the type of holder.

Some embodiments may include an image that displays a trademark, logo or contact information on a headset holder, which is combined with account indicia, which could be a useful advertising tool.

Embodiments of the invention include a method, comprising the steps of: during a transaction, sensing electronically an account indicium coupled to a headset holder; using a processing system, associating the account indicium with information, stored in tangible electronic storage, regarding an account; and reading a stored value balance of the account, or, in an amount corresponding to the transaction, initializing, raising, or lowering the stored value balance.

Embodiments of the invention include an account maintenance system, comprising: a set of software instructions stored in tangible storage; a stored value balance, stored in tangible storage, the stored value balance identified by an account identifier; and processing hardware that (i) receives a transaction request and the account identifier through a communication system, the account identifier having been obtained by accessing account indicia permanently coupled to a headset holder, (ii) retrieves and executes the software instructions, and (iii) updates the stored value balance identified by the account identifier consistently with the transaction request.

DETAILED DESCRIPTION OF EXEMPLARY EMBODIMENTS

Illustrative embodiments of the invention are described by the drawings and the accompanying text below. A person having skill in the art will recognize that many other embodiments and variations are possible within the scope of the invention that couples indicia of stored value with a holder for a headset.

Figure 1:
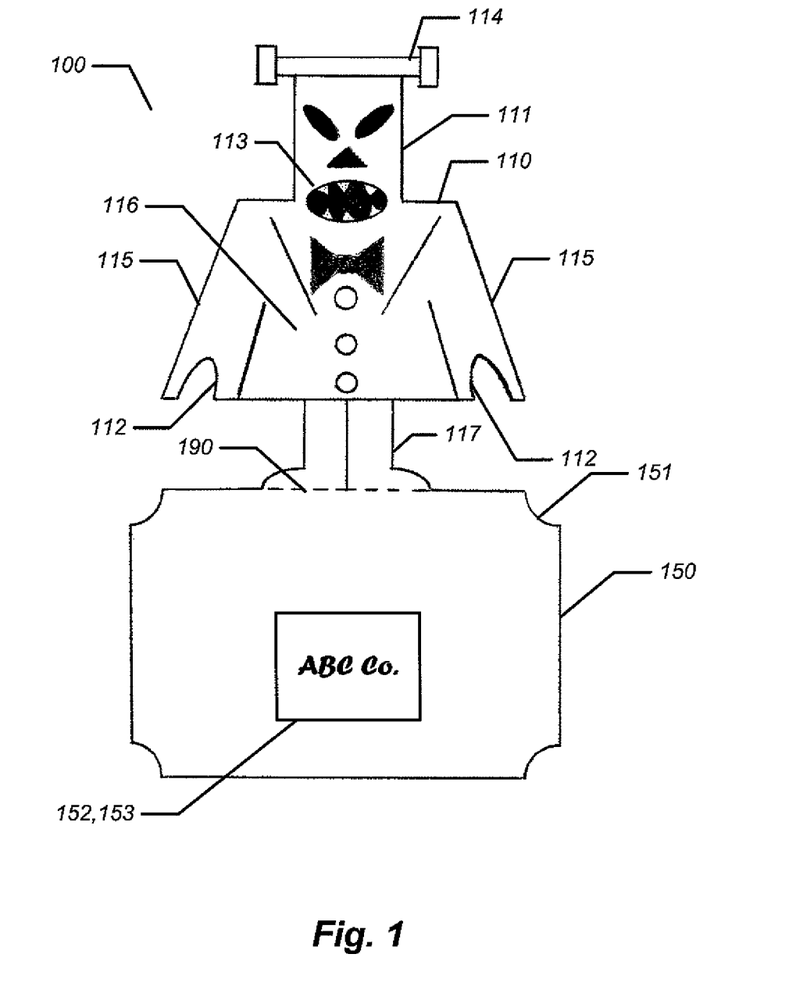
FIG. 1 is a front view of an exemplary headset holder with stored value account indicia.
Figure 2:
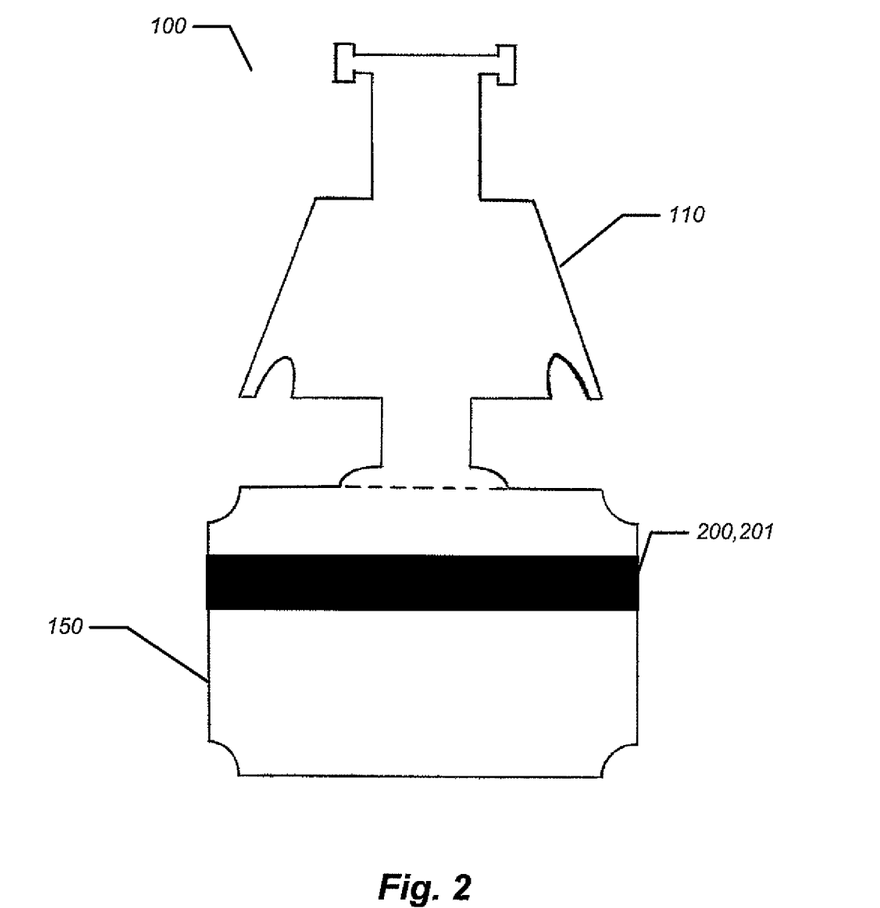
FIG. 2 is a rear view of an exemplary headset holder with stored value account indicia.

FIGS. 1 and 2 are front and rear views of a headset holder with stored value account indicia 100. In this embodiment, a headset holder 110 and a stored value card 150 are fabricated from a single sheet of plastic. The headset holder 110 resembles a creature or monster-person. Between the headset holder 110 and the stored value card 150 is an indentation 190 or a series of perforations in the plastic sheet, making the stored value card 150 separable from the headset holder 110.

The illustrated headset holder 110 includes a spool 111 and two grips 112. Other than being flat, the spool 111 in this embodiment appears similar to a spool used to hold thread for sewing. The top of this spool is capped with a decorative flange 114. The body 116, or central portion 116 of the creature headset holder 110 serves as a flange workalike for holding wire 301 of a headset 300, in this case an earbud headset 333.

The grips 112 in this embodiment are extremities 115 or extensions 115 from the body 116 of the headset holder 110, here limbs or members of a creature. The grips 112 are wire-grips, in other words, grips 112 that are configured for holding wires 301 of the headset 300. In this case, the grips 112 are simple U-shaped indentations in the extremities 115.

In this embodiment, an image 113 is printed on the headset holder 110, namely, a caricature of a monster. The image 113 represents arms of the monster on the extremities 115 that include the grips 112. The head of the monster in the image 113 coincides with the spool 111, which is another extremity 115 of the body 116. The legs 117 are extremities 115 of the monster that form its base and connect the headset holder 110 to the stored value card 150 along indentation 190.

In some circumstances, a person or organization might want to give a headset holder with stored value account indicia 100 as a form of advertising, for example: as a reward to loyal customers; as a way of increasing awareness of a company's name and contact information to clients or client prospects; or as an incentive to visit a store, or to purchase a particular item. In such cases, the headset holder with stored value account indicia 100 might display a company logo or icon, such as the advertising material 153 shown in FIGS. 1 and 3. Other characteristics of the headset holder 110 or stored value card 150 might also serve to promote a brand. For example, the headset holder 110 in FIG. 3 might be colored yellow, in accord with trademarks of BBY Solutions, Inc. Thus, the color might call a trademarked symbol to mind for some observers of the headset holder 110 or stored value card 150.

The headset holder with stored value account indicia 100 in FIG. 1 has attributes 151 that may suggest a company brand, and indeed may be a trademark. In this case, the corners of the stored value card 150 have scallop-shaped cutouts. Attributes 151 such as color, shape, and printed matter may serve this purpose, whether incorporated with the headset holder 110, the stored value card 150, or both. The illustrated stored value card 150 also has advertising material 153 in the form of a logo 152.

FIG. 2 is the rear view of the headset holder with stored value account indicia 100 shown in FIG. 1. The stored value card 150 contains an account indicium 200 of the stored value account. In this case, the account indicium 200 is a magnetic stripe 201, but other types of account indicia 200, such as a barcode 400 or an RFID tag, might be used. A given headset holder with stored value account indicia 100 may have just one account indicium 200, or might have two or more of them.

Figure 3:
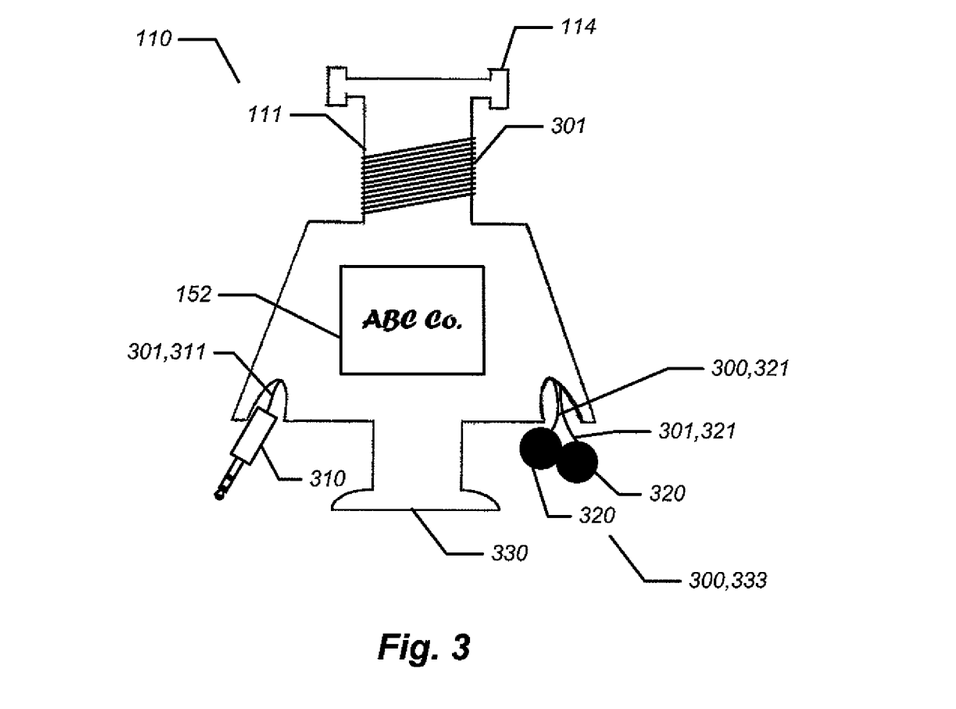
FIG. 3 is a front view of an exemplary headset holder with stored value account indicia, depicted holding an earbud headset.

FIG. 3 is the front view of a headset holder with stored value account indicia 100, whose headset holder 110 is similar to the one shown in FIG. 1. In this case, the headset holder 110 is shown holding a headset 300, in particular, an earbud headset 333. The earbud headset 333 includes a jack 310 and a pair of earbuds 320. The jack 310 is connected to the earbuds 320 by wire 301 that has a Y-shape. The Y-shape wire 301 includes a jack wire 311 and two earbud wires 321, joined at a junction 410. The jack 310 and jack wire 311 are secured by one grip 112. The pairs of earbuds 320 and earbud wires 321 are secured by the other grip 112. Around the spool 111, wire 301 (a combination of jack wire 311 and earbud wire 321) is wrapped. Note that, in this embodiment, the flange 114 at the top of this headset holder 110 plays no role in holding the wire 301, being merely decorative. FIG. 3 shows that advertising material 153, in this case a logo 152, may be included in the headset holder 110.

Figure 4:
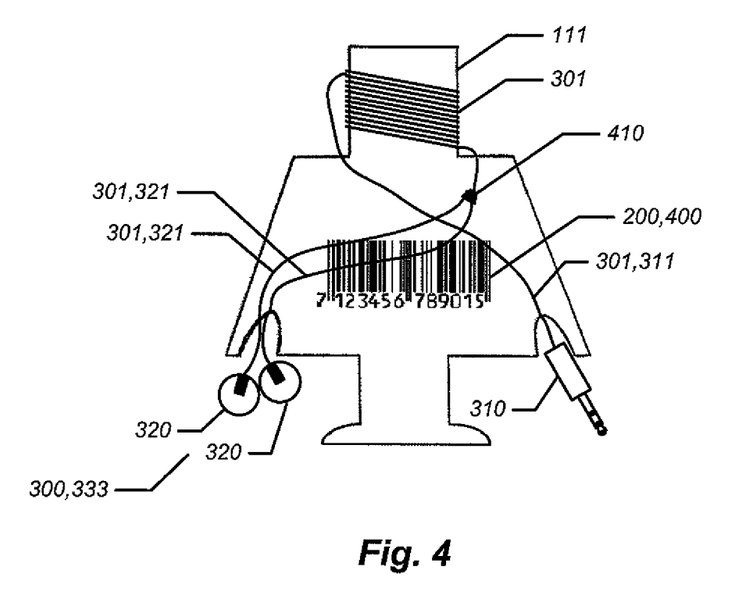
FIG. 4 is a rear view of an exemplary headset holder with stored value account indicia, depicted holding an earbud headset.

FIG. 4 is the rear view of a headset holder with stored value account indicia 100, similar to that shown in FIGS. 1 and 3. However, in this case, the top flange 114 on the spool 111 has been removed to emphasize that it is nonfunctional. Note that the spool 111 might be tapered, with the bottom of the spool 111 being narrower than the top, to assist in keeping the wrapped wire 301 in place. In this embodiment, an account indicium 200 is incorporated directly into the headset holder 110 itself, in this case a barcode 400. A separable stored value card 150 is unnecessary in this embodiment, where the account indicia 200 is permanently coupled to the headset holder 110 itself.

An account indicium 200 associates the headset holder with stored value account indicia 100 with a particular account identifier 650, which identifies a unique account. Account information may be maintained in an account maintenance system 600, as later described in connection with FIGS. 6 and 7.

Figure 5A:
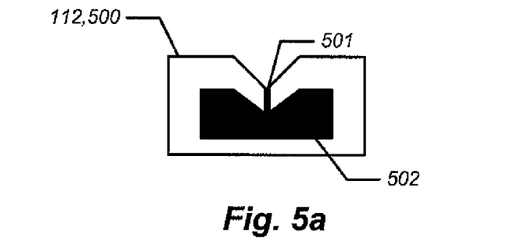
FIG. 5a is an exemplary slotted grip for holding wires in a headset holder with stored value account indicia.
Figure 5B:
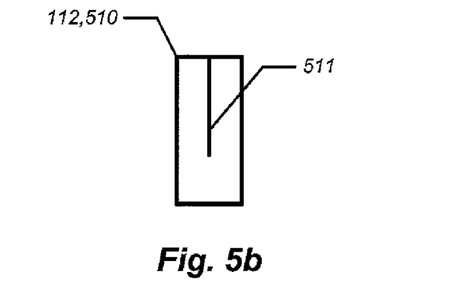
FIG. 5b is an exemplary slit grip for holding wires in a headset holder with stored value account indicia.
Figure 5C:
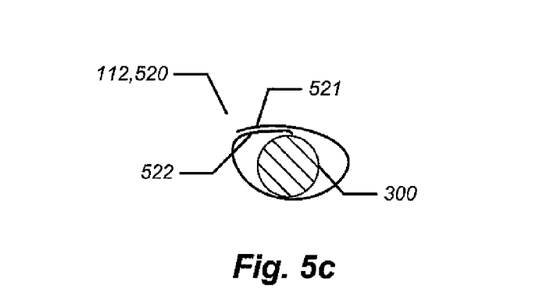
FIG. 5c is an exemplary grip, which uses hook and loop technology, for holding wires in a headset holder with stored value account indicia.

Grips 112 of a headset holder 110 may have a many forms. FIG. 5a-5c show a few exemplary structures, but many others are possible. FIG. 5a illustrates a 2D grip 112, namely a slot grip 500, that includes a slot 501. Wire 301 can be pulled through the slot 501, and secured within a chamber 502. The slot grip 500 requires some flexibility in surrounding plastic to get the wire 301 into and out from the chamber 502. FIG. 5b is another 2D grip 112, namely, a slit grip 510, containing a slit.

The account indicia 200 allow the headset holder with stored value account indicia 100 to be scanned, the scanning possibly accomplishing several purposes. An initial scan by a POS system of the headset holder with stored value account indicia 100 may establish an initial balance. A particular headset holder with stored value account indicia 100 might have a fixed initial balance, or the user (e.g., a donor or donee) might be free to specify and purchase an initial balance, which might be entered by a salesperson at POS into the account maintenance system 600. The initial scan might also activate the account, so that the account maintenance system 600 will allow future purchases of goods or services or other expenditures to be made against the stored value. The initial scan might also update inventory data pertaining to this or a similar headset holder with stored value account indicia 100, and update transactional data pertaining to the purchase and activation. Subsequent scans can be used to reduce the stored value to make purchases or expenditures. In some embodiments, additional stored value can be purchased, which typically would also involve scanning the headset holder with stored value account indicia 100.

FIG. 5c illustrates a headset holder 110 that utilizes hook and loop 520 technology to hold wire 301. A similar approach could be used to secure a pair of wires 301, or to hold a jack 310 or earbuds 320 directly. An outer segment 522 might contain hooks on its interior surface, and an inner segment 521 might contain loops on its outer surface, or conversely. Many other types of grips 112, such as a grip 112 that incorporates an elastic band or cord, that secures wires, jack or headphones, are also within the scope of the invention.

Figure 6:
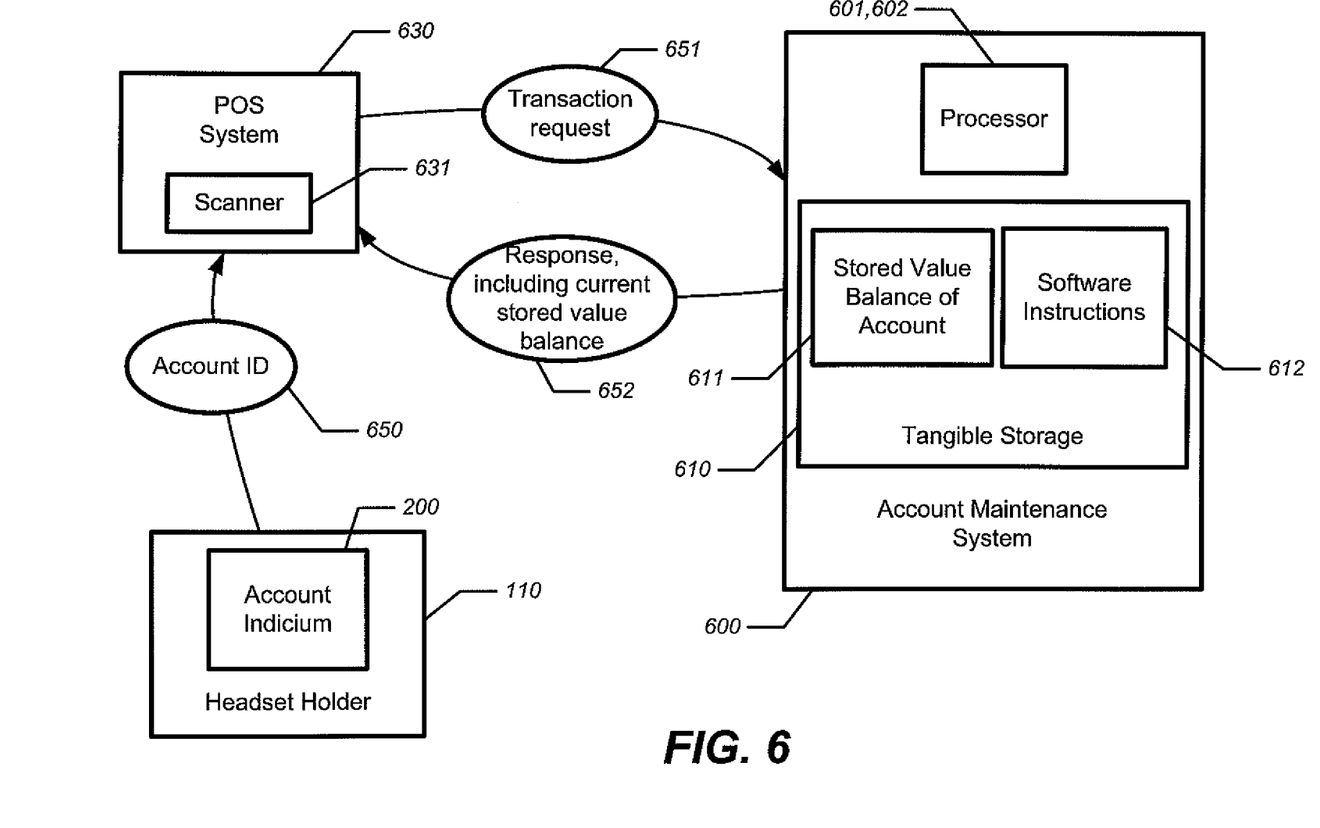
FIG. 6 is a schematic showing an exemplary account maintenance system for maintaining a stored value balance associated with a headset holder with stored value account indicia.

FIG. 6 is a schematic showing an exemplary account maintenance system 600 for maintaining a stored value balance associated with a headset holder with stored value account indicia 100. The account maintenance system 600 includes processing hardware 601 that executes logic represented in hardware and/or software. The processing hardware 601 might include a hardware processor 602, such as the kind of processor 602 that might be included in a computer or a smart cell phone. Some or all of the functionality of the account maintenance system 600 might be performed by the headset holder with stored value account indicia 100 itself, through a smart chip or an internal processing system.

A smart chip, such as an RFID tag, might draw power from a battery or external source. Preferably, it will contain a logic in the form of hardware/and or software instructions, that would draw power from a scanner or reader device, so that account information and stored value balance might be changed within the headset holder with stored value account indicia 100 itself.

The account maintenance system 600 might be a processing system—by a "processing system" we mean one or more devices having processors 602, such as computers, possibly communicating over one or more networks or any other electronic communications systems, and utilizing one or more storage devices and peripheral devices, possibly under the management of one or more persons or entities, and controlled by various logical units such as hardware and software programs. The logic might be wholly or partially in the form of software instructions 612, which might be stored in some form of tangible storage 610, and retrieved by the processing hardware 601 as needed. The tangible storage 610 might be a hard drive, an optical disk, a memory card, or any other volatile or non-volatile hardware device that can retain information in electronic form.

A stored value balance 611 associated with the headset holder with stored value account indicia 100 will also be stored in tangible storage 610, which might be within the same device or a different device from the device(s) containing the software instructions 612. The stored value balance 611 might be stored in a database, file, or any other information storage representations. If the stored value balance 611 is maintained in a database, an account identifier 650 might be used to associate the correct stored value balance 611 with this particular headset holder with stored value account indicia 100.

In the example shown in FIG. 6, a POS system 630 includes a scanner 631. A transaction (e.g., report account balance; purchase an item; increase account balance) involving the headset holder with stored value account indicia 100 can be performed by scanning the account indicium 200 that is permanently coupled to the headset holder with stored value account indicia 100. In this example, an account identifier 650 is read by the scanner 631 and provided to the POS system 630. The POS system 630 transmits a transaction request 651 for the appropriate transaction, along with the account identifier 650 to the account maintenance system 600. The account maintenance system 600 handles the transaction by executing software instructions 612 on the processor 602, which accesses the stored value balance 611, and modifies the balance accordingly if necessary. A transaction response 652 is then returned by the account maintenance system 600 to the POS system 630, showing the current, possibly updated, stored value balance 611.

Figure 7:
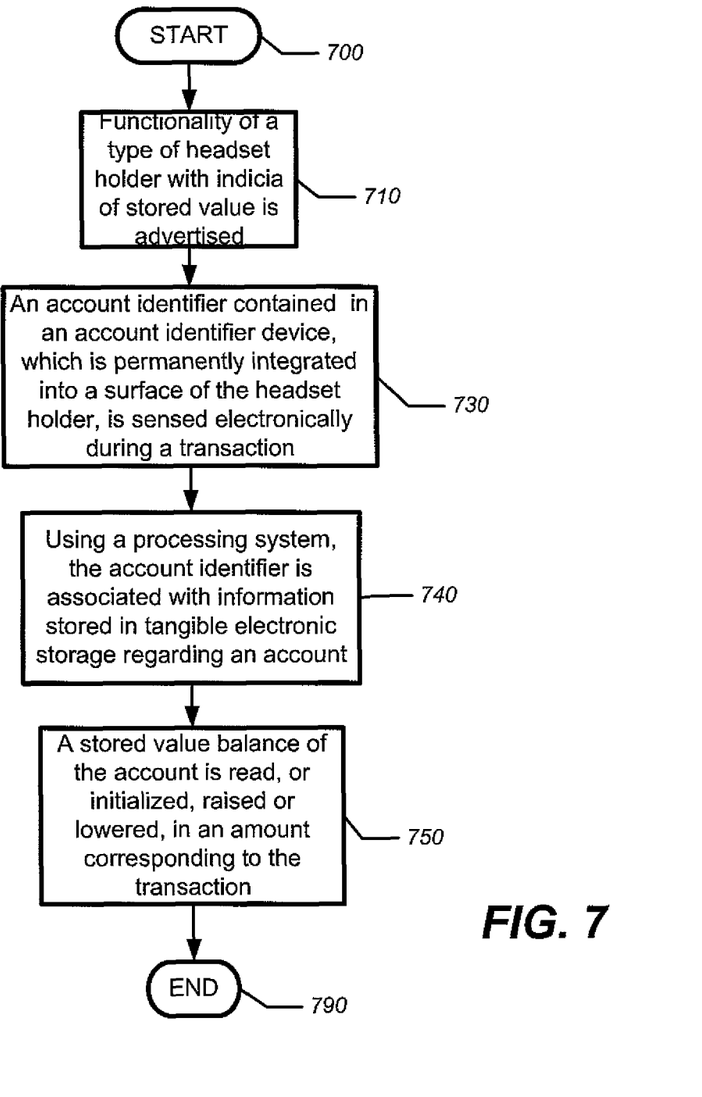
FIG. 7 is a flow chart showing an exemplary process for accessing, during a transaction, the stored value represented by a headset holder with stored value account indicia.

FIG. 7 is a flowchart illustrating an embodiment of the invention. After the start 700, some functionality of a type of headset holder with stored value account indicia 100 is advertised 710. The "type" might be, for example, a particular manufacturer, vendor, brand, model, or SKU of the headset holder with stored value account indicia 100. The functionality might be any feature of the headset holder with stored value account indicia 100, such as the combination of a headset holder 110 and stored value capability. As described previously, a headset holder with stored value account indicia 100 integrates stored value functionality into a headset holder 110. The advertising might be by any method employed by a seller of the type of headset holder with stored value account indicia 100; for example, a newspaper advertisement; online publication of products and their capabilities; an in-store display of a headset holder with stored value account indicia 100 for sale; or a demonstration by a salesperson of a headset holder with stored value account indicia 100 to a customer. Note that some embodiments of the methods of the invention do not include this advertising step.

An account identifier 650 contained in account indicia 200, printed on, or otherwise permanently integrated into, the surface of the headset holder with stored value account indicia 100, is sensed 730 electronically during a transaction. For example, the transaction might be to read the stored value balance associated with the headset holder with stored value account indicia 100; initialization or activation of the stored value in the headset holder with stored value account indicia 100; purchase of the headset holder with stored value account indicia 100; purchase of goods or services, or payment of debt, using the headset holder with stored value account indicia 100; other expenditure of value from the headset holder with stored value account indicia 100; increase in the stored value of the headset holder with stored value account indicia 100; or any other transaction involving scanning the headset holder with stored value account indicia 100. Sensing might involve any kind of equipment, such as a handheld device or a POS scanner. Sensing might use any technology, such as radio frequencies, laser, charge-coupled device (CCD) technology, Contact Image Sensor (CIS) technology, photomultiplier tube technology, photographic scanning, or 3D scanning technology. Sensing might be performed actively by a person, or passively by an automated sensing device such as an RFID sensor. The person might be anyone, such as an employee of a store that is selling the headset holder with stored value account indicia 100, applying the stored value to a purchase, or adding stored value to the headset holder with stored value account indicia 100; it might be a headset holder with stored value account indicia 100 purchaser, giver, recipient, or owner. The account identifier 650 will usually be a sequence of letters and/or numerals, but it could be any combination of symbols that might uniquely identify an account. The account indicium 200 might be a magnetic strip, a barcode 400, a smart chip, a RFID tag, or any other type of device from which a sensor might sense or read an account identifier 650. "Electronically" merely implies that some aspect of the sensing involves electricity.

Using a processing system (defined broadly, as described previously), the account identifier is associated 740 with information stored in tangible electronic storage regarding an account. Note that the account may not exist in the storage prior to the transaction. For example, upon activation of a headset holder with stored value account indicia 100, data regarding an account may be initialized within the storage 610, but association will be performed nevertheless between the account indicium 200 and the new account. A stored value balance 611 of the account is read from storage 610, or, in an amount corresponding to the transaction, initialized, raised, or lowered 750. For example, the stored value balance 611 might be initialized at when a donor purchases a headset holder with stored value account indicia 100 as a gift and the headset holder with stored value account indicia 100 is activated. The stored value balance 611 might be lowered when a recipient of a gift headset holder with stored value account indicia 100 uses the headset holder with stored value account indicia 100 to make a purchase. The stored value balance 611 might be increased upon activation, if the account already exists in storage 610 with a zero balance. This might also be regarded as initialization of the stored value balance 611. The stored value balance 611 might also be increased, for example, by a recipient of a gift headset holder with stored value account indicia 100 (or by the original giver or anyone else) by a purchase of additional stored value. The process ends 760. In other embodiments, the stored value balance 611 is retrieved upon sensing.

Of course, many variations of the above embodiments are possible within the scope of the invention. For example, the illustrative embodiments herein have focused on a 2D holder for earbud headphones. All other forms of headsets and headset holders, coupled to an indicium of stored value, are within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. An apparatus, comprising:
    a) a headset holder, which includes a slot grip that will hold a wire securely during handling of the headset holder when the headset holder is holding a headset; and
    b) an account indicium, coupled to the headset holder, that corresponds to a stored value account.

2. An apparatus, comprising:
    a) a headset holder, which includes a slit grip that will hold a wire securely during handling of the headset holder when the headset holder is holding a headset; and
    b) an account indicium, coupled to the headset holder, that corresponds to a stored value account.

3. An apparatus, comprising:
    a) a headset holder that includes a grip that will hold a wire securely during handling of the headset holder when the headset holder is holding a headset, wherein the grip includes a hook and loop fastener; and
    b) an account indicium, coupled to the headset holder, that corresponds to a stored value account.

* * * * *

UNITED STATES PATENT AND TRADEMARK OFFICE
CERTIFICATE OF CORRECTION

| | | |
|---|---|---|
| PATENT NO. | : 8,668,147 B2 | Page 1 of 1 |
| APPLICATION NO. | : 13/043589 | |
| DATED | : March 11, 2014 | |
| INVENTOR(S) | : Jim Jackson | |

It is certified that error appears in the above-identified patent and that said Letters Patent is hereby corrected as shown below:

In the Specification

Column 3, Line 7, Delete "painting." and insert --painting,--, therefor.

Signed and Sealed this
Eighth Day of September, 2015

Michelle K. Lee
*Director of the United States Patent and Trademark Office*